Mar. 6, 1923.
F. W. COATS.
HOG CRATE.
FILED JUNE 19, 1922.
1,447,835.
2 SHEETS—SHEET 1.
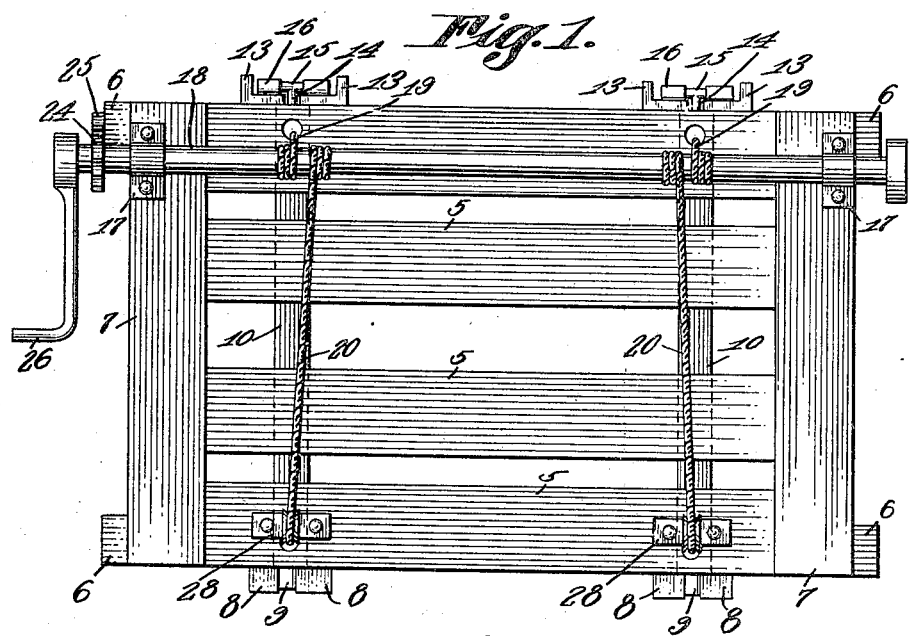
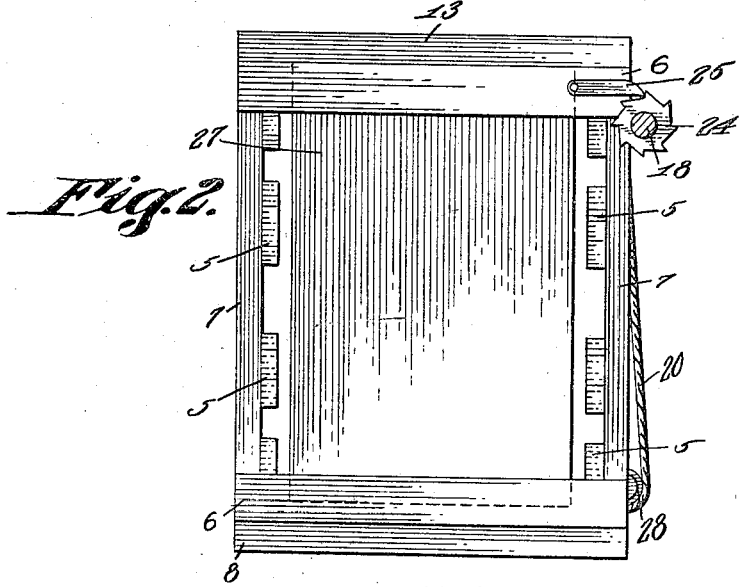
F. W. Coats, Inventor

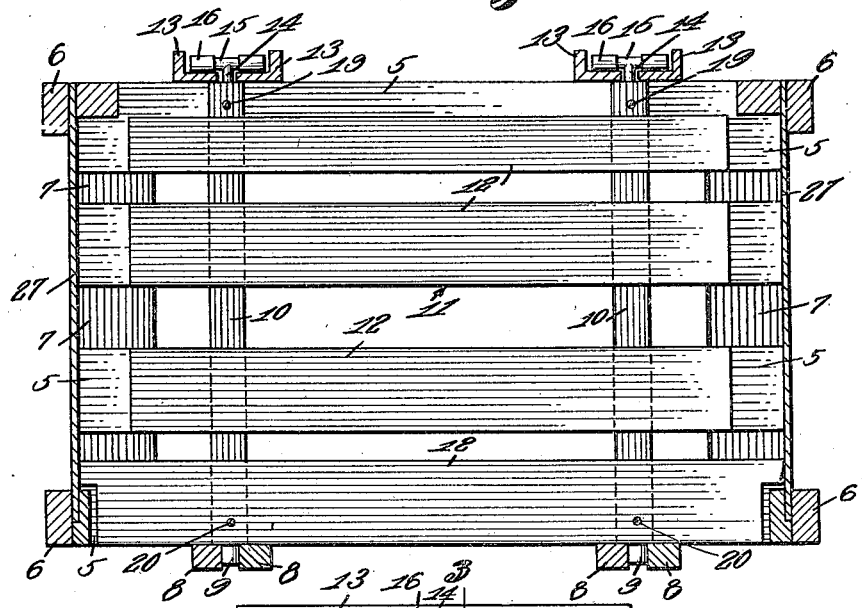

Patented Mar. 6, 1923.

1,447,835

UNITED STATES PATENT OFFICE.

FRANK W. COATS, OF VEEDERSBURG, INDIANA.

HOG CRATE.

Application filed June 19, 1922. Serial No. 569,264.

*To all whom it may concern:*

Be it known that I, FRANK W. COATS, a citizen of the United States, residing at Veedersburg, in the county of Fountain and State of Indiana, have invented a new and useful Hog Crate, of which the following is a specification.

This invention relates to restraining devices, and aims to provide novel means for catching or holding swine or the like animals to facilitate the ringing or treating of the animal.

Another object of the invention is to provide a device of this character which will engage the sides of the animal to prevent injury by bruising the animal.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a restraining device constructed in accordance with the present invention.

Figure 2 is an end elevational view of the same.

Figure 3 is a longitudinal sectional view taken on line 3—3 of Figure 4.

Figure 4 is a transverse sectional view.

Referring to the drawings in detail, the device embodies a housing formed of longitudinal bars 5 connected at their ends by means of the transverse bars 6 and vertical bars 7.

Having connection with the lowermost bars 5 of the housing, are spaced bars 8, which are arranged in pairs and disposed adjacent to the ends of the housing, the bars providing guideways for the pins 9 carried by the vertical bars 10 forming a part of the movable clamping member indicated generally by the reference character 11.

The clamping member 11 also embodies longitudinal bars 12 which connect with the vertical bars 10. Extending transversely of the housing and connected with the uppermost bars 5 are the transversely extended angle irons 13 which are also arranged in pairs, the angle irons of each pair being spaced apart to provide a clearance for the arm 14 associated therewith, the arms 14 being shown as formed with integral sections 15 providing axles for the rollers 16, to permit the clamping member 11 to move freely with respect to the members 13.

Supported within the bearings 17 which are disposed adjacent to the upper section of the housing, is a shaft 18 which shaft accommodates the flexible connecting members 19 and 20, adjacent to the ends thereof, the connecting members 19 having one of their ends secured to the shaft 18, the opposite ends thereof having connection with the vertical bars 10 adjacent to the upper ends thereof, to move the bars together with the bars 12 supported thereby, towards one of the side walls of the housing.

The flexible connecting members 20 have one of their respective ends secured to the shaft 18 so that the same may be wound thereon, the opposite ends of the connecting members 20 being secured to the lower end of the movable clamping member as clearly shown by Figure 3 of the drawings, it being understood that portions of the connecting members wound on the shaft 18, are equal in lengths so that the upper and lower ends of the clamping member 11 are moved relatively.

A coiled spring indicated at 21 has connection with one of the side walls of the housing as at 22, while the opposite end thereof has connection with the clamping member 11 as at 23, for returning the clamping member to its normal or inactive position. A ratchet indicated at 24 is secured to the shaft 18 and cooperates with the pawl 25 for holding the shaft 18 against reverse movement when the same has been operated to move the clamping member to its active position. An operating handle 26 is mounted on the shaft 18 so that rotary movement may be imparted thereto.

Sliding closures 27 close the ends of the housing and are constructed so that they may be moved vertically and held in such positions to admit an animal to the housing.

In the use of the device, the closure at one end of the housing is moved to its open position, whereupon the animal to be treated, may be driven into the housing. When the animal has passed into the housing the shaft 18 is operated to move the clamping member 11 to clamp the animal between the movable member and one of the side walls of the housing.

Thus it will be seen that the animal will be held against movement and may be treated with facility.

It might be further stated that the intermediate portions of the flexible members 20 operate over pulleys 28 supported adjacent to the bottom of the housing as clearly shown by Figure 1 of the drawings.

Having thus described the invention, what is claimed as new is:

In a device of the character described, a housing, said housing including side and end walls, pairs of spaced bars disposed in spaced relation and connecting the side walls, a transversely movable clamping member including vertical bars having pins at the lower ends thereof, the pins moving between the pairs of spaced bars to guide the clamping member, manually controlled means for moving the clamping member into clamping relation with one of the walls of the housing, and resilient means for returning the clamping member to its inactive position.

In testimony that I claim the foregoing as my own, I have hereto affixed my signature in the presence of two witnesses.

FRANK W. COATS.

Witnesses:
ALBERT J. GASSETT,
J. W. MARSHALL.